US010823231B2

(12) United States Patent
Merrill et al.

(10) Patent No.: US 10,823,231 B2
(45) Date of Patent: Nov. 3, 2020

(54) DAMPING MEMBER SUPPORT AND POWERTRAIN ASSEMBLY FOR A WORK VEHICLE

(71) Applicant: Deere & Company, Moline, IL (US)

(72) Inventors: Bradley A. Merrill, Dike, IA (US); Allan N. Schott, Dike, IA (US)

(73) Assignee: DEERE & COMPANY, Moline, IL (US)

( * ) Notice: Subject to any disclaimer, the term of this patent is extended or adjusted under 35 U.S.C. 154(b) by 142 days.

(21) Appl. No.: 16/142,688

(22) Filed: Sep. 26, 2018

(65) Prior Publication Data
US 2020/0096048 A1 Mar. 26, 2020

(51) Int. Cl.
*F16D 3/06* (2006.01)
*F16D 3/04* (2006.01)

(52) U.S. Cl.
CPC ........ *F16D 3/06* (2013.01); *F16D 3/04* (2013.01)

(58) Field of Classification Search
CPC ..................................... F16D 3/06; F16D 3/04
See application file for complete search history.

(56) References Cited

U.S. PATENT DOCUMENTS

| | | | | |
|---|---|---|---|---|
| 2002/0139630 A1* | 10/2002 | Shih | ...................... | F16F 15/134 192/55.61 |
| 2008/0176662 A1* | 7/2008 | Tateno | ................ | F16F 15/1203 464/160 |
| 2009/0166113 A1* | 7/2009 | Luo | ........................ | B60W 10/02 180/65.265 |
| 2010/0243404 A1* | 9/2010 | Saeki | ..................... | F16F 15/129 192/213.22 |
| 2010/0323801 A1* | 12/2010 | Boelling | ............ | F16F 15/12326 464/68.8 |
| 2011/0132137 A1* | 6/2011 | Kaneyasu | .......... | F16F 15/12346 74/572.2 |
| 2012/0115619 A1* | 5/2012 | Takenaka | ................ | F16F 15/129 464/45 |
| 2013/0217511 A1* | 8/2013 | Polifke | .............. | F16F 15/13453 464/101 |
| 2017/0268600 A1* | 9/2017 | Hennebelle | ............ | F16F 15/145 |
| 2019/0170212 A1* | 6/2019 | Ishibashi | ............. | F16F 15/1457 |

FOREIGN PATENT DOCUMENTS

DE 3535439 A1 4/1987

OTHER PUBLICATIONS

German Search Report issued in counterpart application No. 102019212723.1 dated Apr. 28, 2020 (08 pages).

* cited by examiner

*Primary Examiner* — Darlene P Condra

(57) ABSTRACT

A damping member support for non-torsional force bypass around a torsional damping member includes a damping member engagement portion configured to be coupled to the torsional damping member and an intermediate portion configured to transmit a non-torsional force between a shaft and the torsional damping member.

17 Claims, 5 Drawing Sheets

US 10,823,231 B2

DAMPING MEMBER SUPPORT AND POWERTRAIN ASSEMBLY FOR A WORK VEHICLE

BACKGROUND OF THE DISCLOSURE

Vehicles, such as tractors or other work vehicles, may experience spikes or temporary events of high torsional force or vibration between the engine and another powertrain component, such as a transmission or driveshaft. A torsional damper may reduce extreme torque and/or vibration values in a vehicle powertrain, thereby preventing premature wear and/or damage to engine, driveshaft, and/or other powertrain components. However, such vehicles may also experience substantial non-torsional forces, such as axial and/or radial forces, at or between powertrain components and/or between parts of the torsional damper. In one non-limiting example, a shifting operation of a transmission of the work vehicle may produce and send a substantial axial force through a torsional damper shaft. Additionally, radial and unbalance loads from the mass and/or rotation of the driveshaft may be sent to or through the torsional damper. Such non-torsional forces may cause premature wear and/or damage to the torsional damper and/or other powertrain components.

Therefore, there exists a need in the art for a damping member support and a powertrain assembly for a work vehicle that reduce the likelihood of premature wear and/or damage from non-torsional forces.

SUMMARY OF THE DISCLOSURE

According to an aspect of the present disclosure, a damping member support is provided for non-torsional force bypass around a torsional damping member. The support includes a shaft engagement portion configured to be rotatably coupled to a shaft transmitting a torsional force, a damping member engagement portion configured to be coupled to the torsional damping member, and an intermediate portion disposed between the shaft engagement portion and the damping member engagement portion and configured to transmit a non-torsional force between the shaft and the torsional damping member.

According to an aspect of the present disclosure, a powertrain assembly for a work vehicle is provided. The assembly includes an engine having a flywheel configured to provide torsional force for the work vehicle, a powertrain component receiving the torsional force from the engine, a shaft disposed between the flywheel of the engine and the powertrain component, the shaft transferring the torsional force between the flywheel and the powertrain component, a torsional damping member coupled to the flywheel and the shaft to transfer the torsional force between the flywheel and the shaft through the torsional damping member, and a damping member support having a damping member engagement portion coupled to the torsional damping member and an intermediate portion transmitting a non-torsional force between the shaft and the torsional damping member.

Other features and aspects will become apparent by consideration of the detailed description and accompanying drawings.

BRIEF DESCRIPTION OF THE DRAWINGS

The detailed description of the drawings refers to the accompanying figures in which.

DETAILED DESCRIPTION OF THE DRAWINGS

Figure 1:
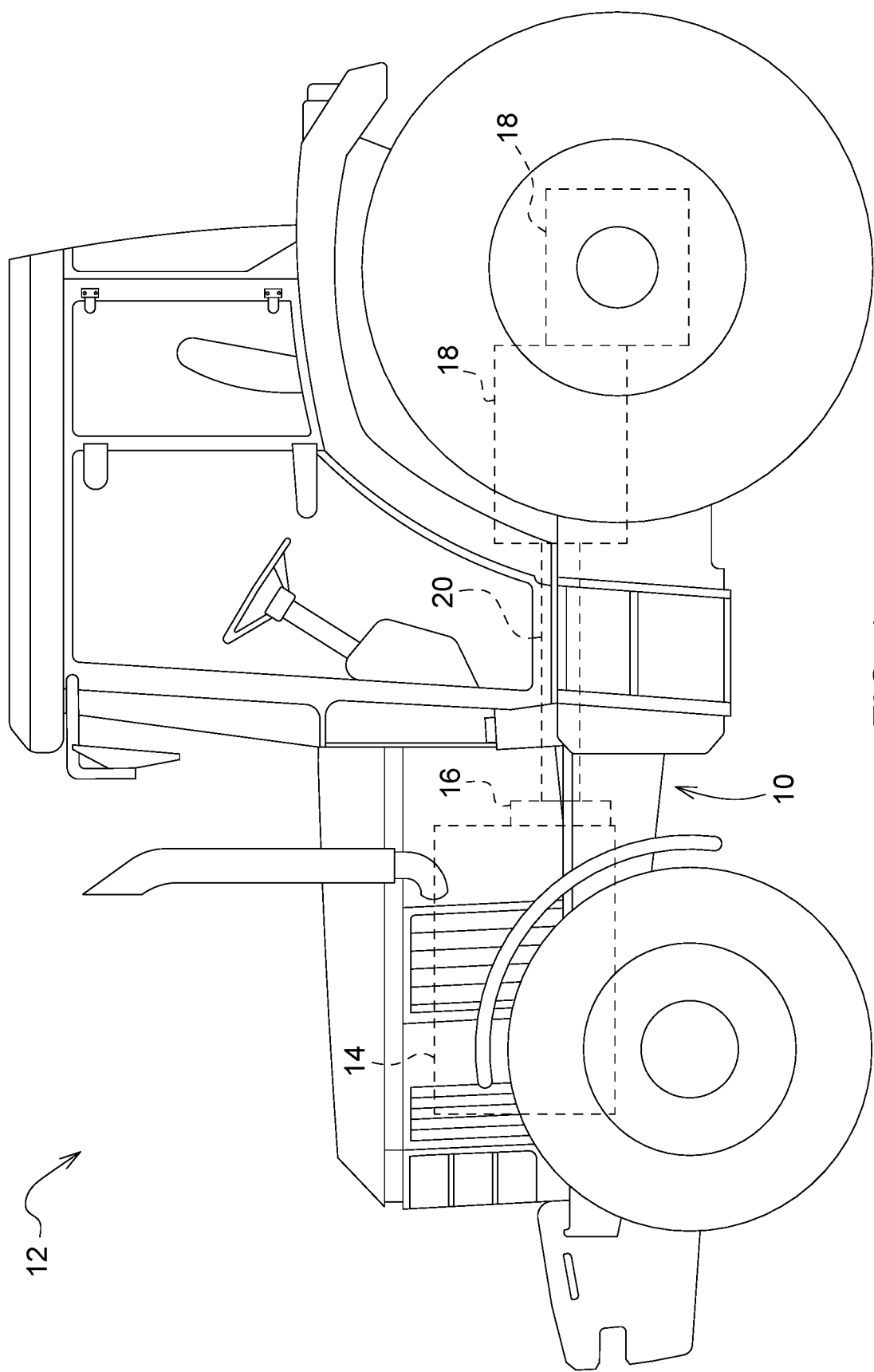
FIG. 1 illustrates a work vehicle in accordance with an embodiment of the present disclosure.

Referring to FIG. 1, a powertrain assembly 10 for a work vehicle 12 is provided in accordance with an embodiment of the present disclosure. The assembly 10 of the embodiment illustrated in FIG. 1 includes an engine 14. The engine 14 includes a flywheel 16. The engine 14 generates and/or provides a torsional force that is provided at least partially through the flywheel 16 for movement or other operation of the work vehicle 12. The assembly 10 further includes at least one powertrain component 18. As part of at least one of its functions, the powertrain component 18 receives the torsional force from the engine 14. The powertrain component 18 illustrated in FIG. 1 is a transmission, but may include a differential, coupling, and/or other gear system and/or another drivetrain or powertrain component or assembly. The assembly 10 further includes a shaft 20 disposed between the flywheel 16 of the engine 14 and the powertrain component 18. The shaft 20 of the illustrated embodiment transfers the torsional force between the flywheel 16 and the powertrain component 18. The term "force" or "load" as used herein refers to, without limitation, any force, load, or other form of energy capable of acting on or through the portion, component, or system described.

Figure 2:
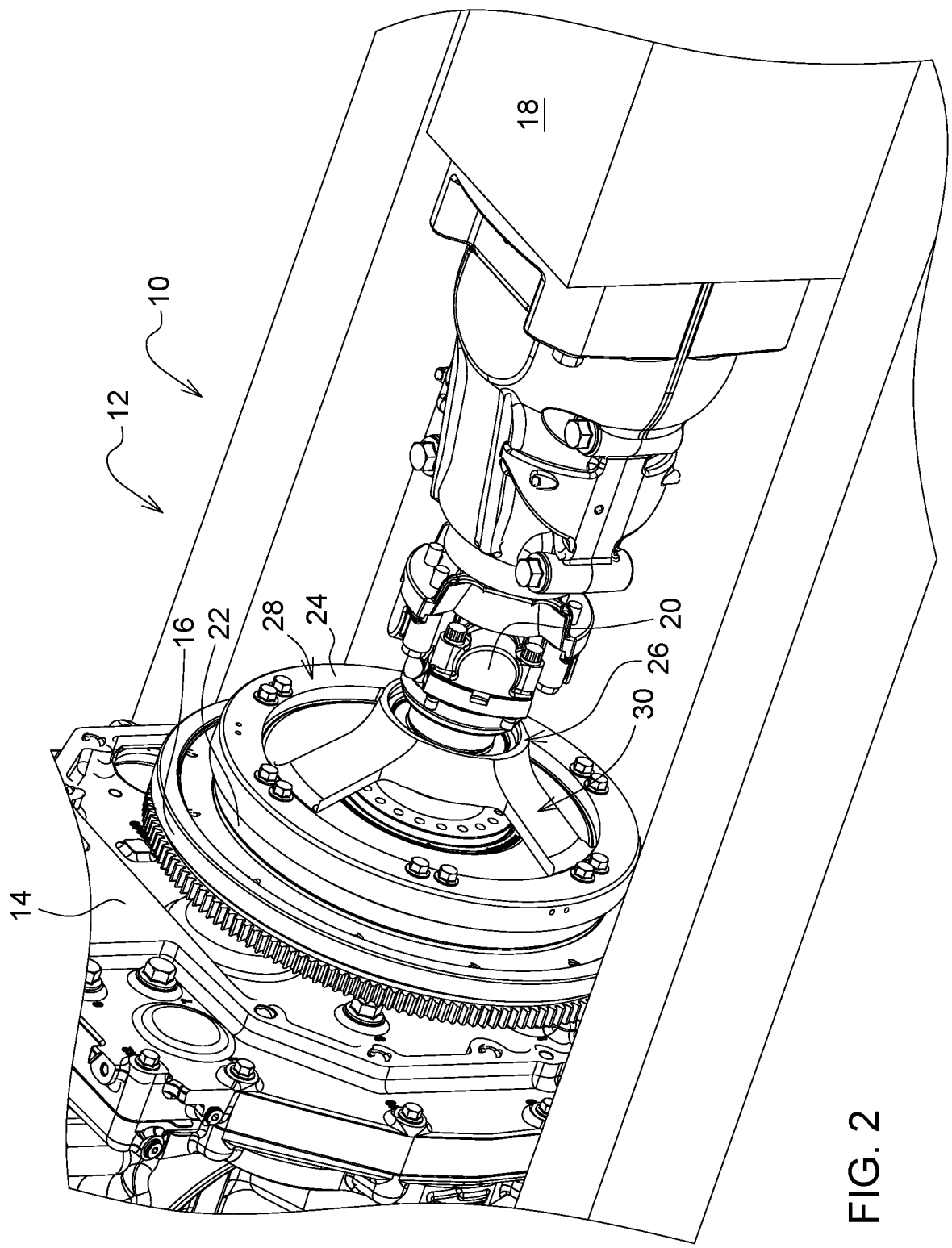
FIG. 2 illustrates a powertrain assembly for a work vehicle in accordance with an embodiment of the present disclosure.

Referring now to FIG. 2, with continuing reference to FIG. 1, the assembly 10 further includes a torsional damping member 22 coupled to the flywheel 16 and the shaft 20. In the illustrated embodiment, the torsional damping member 22 is fixedly or rigidly coupled to the flywheel 16, i.e., coupled against relative angular, axial, or other displacement or motion. As illustrated in FIG. 2, the torsional damping member 22 is disposed generally between the flywheel 16 and the shaft 20 behind the engine 14. The torsional damping member 22 transfers the torsional force between the flywheel 16 and the shaft 20 through the torsional damping member 22. The torsional damping member 22 is configured to reduce extreme values or fluctuations in torsional force or vibration by incorporating springs or other biasing members and/or viscous or other fluids that are acted upon by displacement, movement, torque, or vibration of or between the first portion 38 and the second portion 40 of the torsional damping member 22, as illustrated in FIGS. 4 and 5 and described in further detail below.

Figure 3:
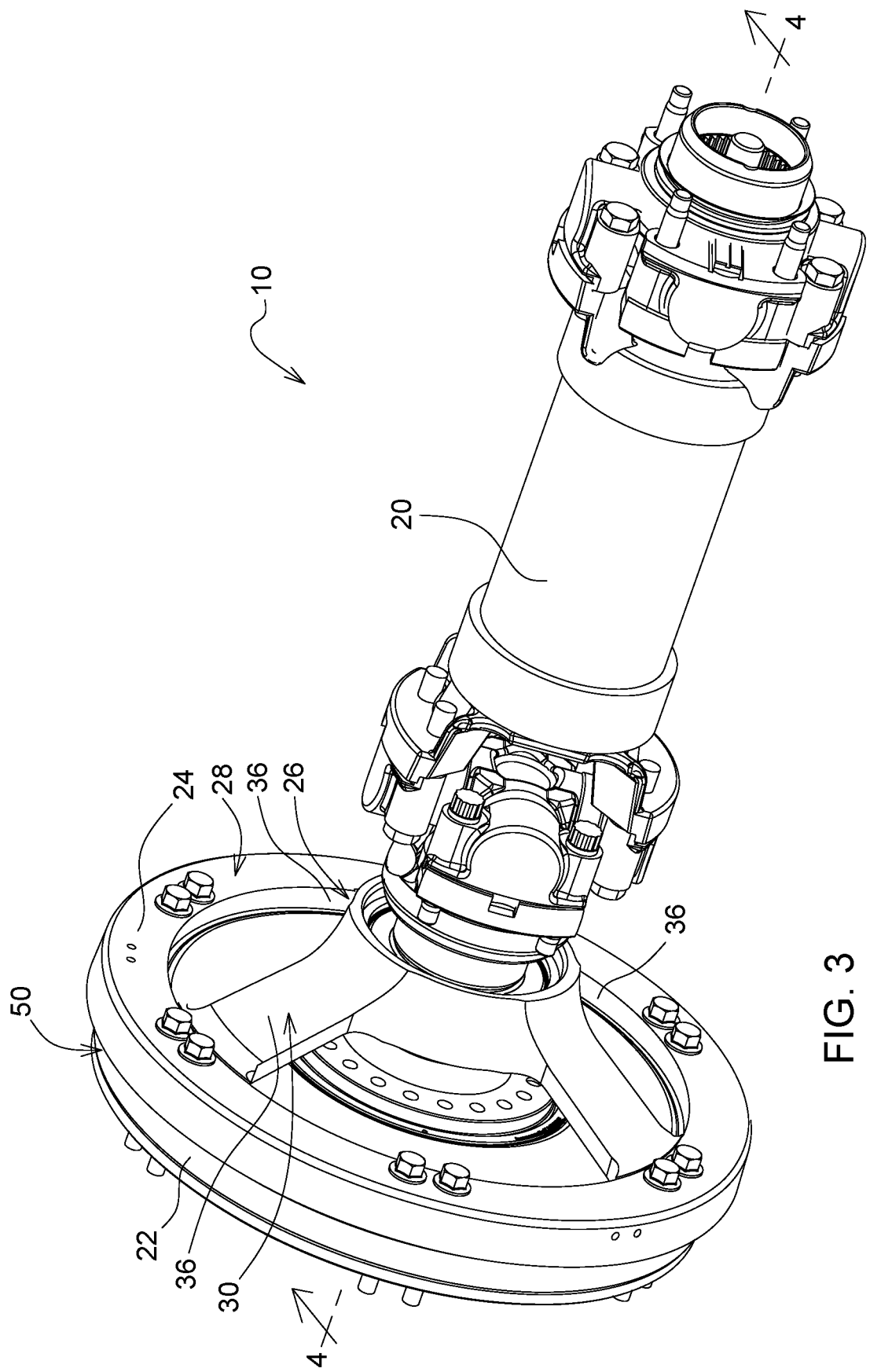
FIG. 3 illustrates a powertrain assembly for a work vehicle in accordance with an embodiment of the present disclosure.

As illustrated in FIGS. 2 and 3, the assembly 10 further includes a damping member support 24 coupled to the torsional damping member 22. In the illustrated embodiment, the damping member support 24 is rigidly or fixedly coupled to the torsional damping member 22 at an outer circumferential portion 50 of the torsional damping member 22. The damping member support 24 allows axial, radial, and other non-torsional forces to bypass the torsional damping member 22 and/or act around or be shared with the torsional damping member 22 such that non-torsional forces transmitted through portions of the torsional damping member 22 not rigidly or fixedly coupled to the flywheel 16 are reduced or eliminated. In additional embodiments not illustrated, the damping member support 24 may be coupled to the torsional damping member 22 at another portion of the torsional damping member 22 to prevent or reduce non-torsional forces acting on or through one or more interfaces of the torsional damping member 22.

The damping member support 24 includes a shaft engagement portion 26 rotatably coupled to the shaft 20, i.e., coupled to the shaft 20 while allowing relative pivoting or rotation. The damping member support 24 further includes a damping member engagement portion 28 coupled to the torsional damping member 22 and an intermediate portion 30 transmitting a non-torsional force between the shaft 20 and the torsional damping member 22 in the illustrated embodiment. The intermediate portion 30 is disposed between the shaft engagement portion 26 and the damping member engagement portion 28 in the illustrated embodiment.

Figure 4:
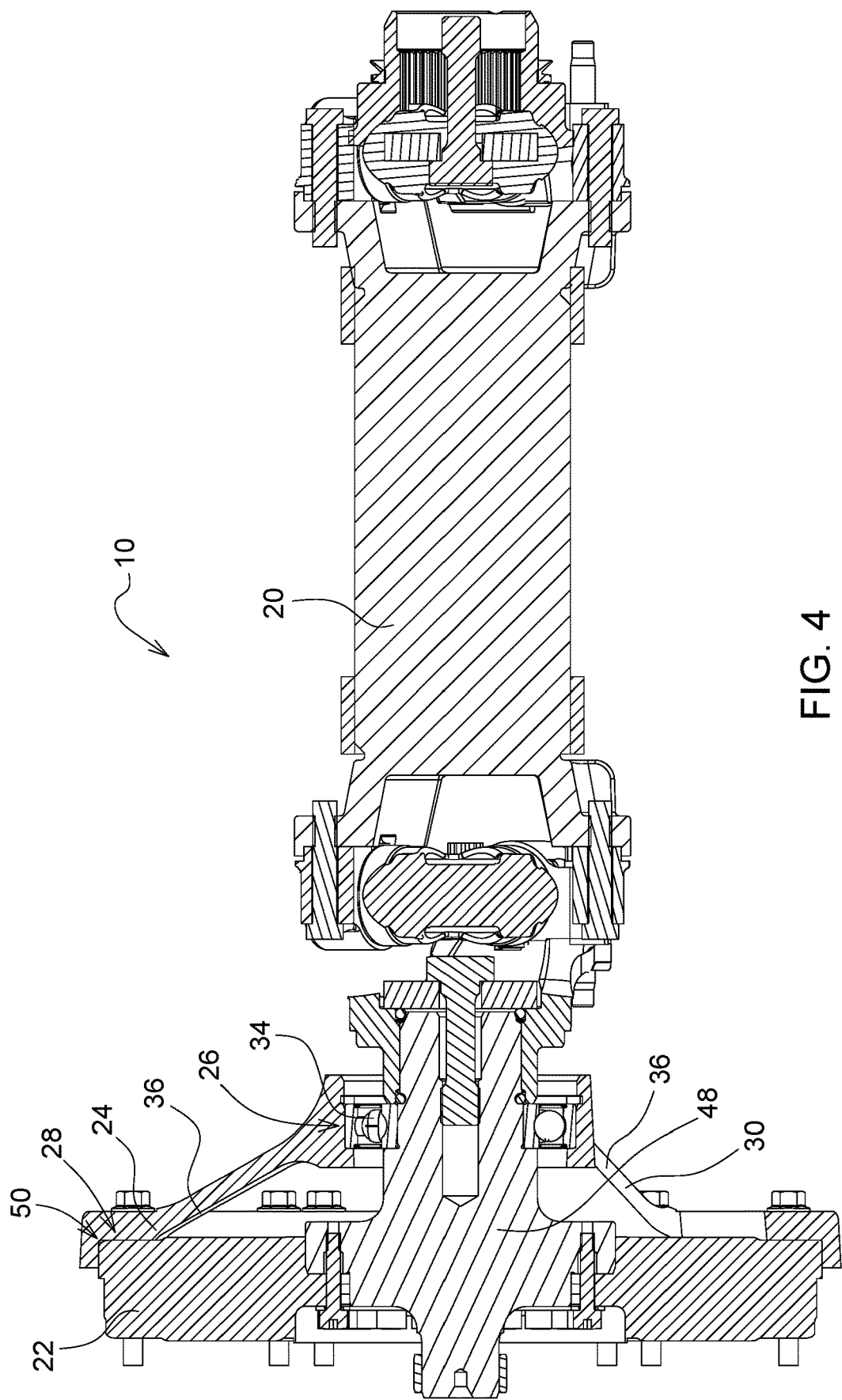
FIG. 4 is a cross-sectional view of a powertrain assembly for a work vehicle in accordance with an embodiment of the present disclosure.
Figure 5:
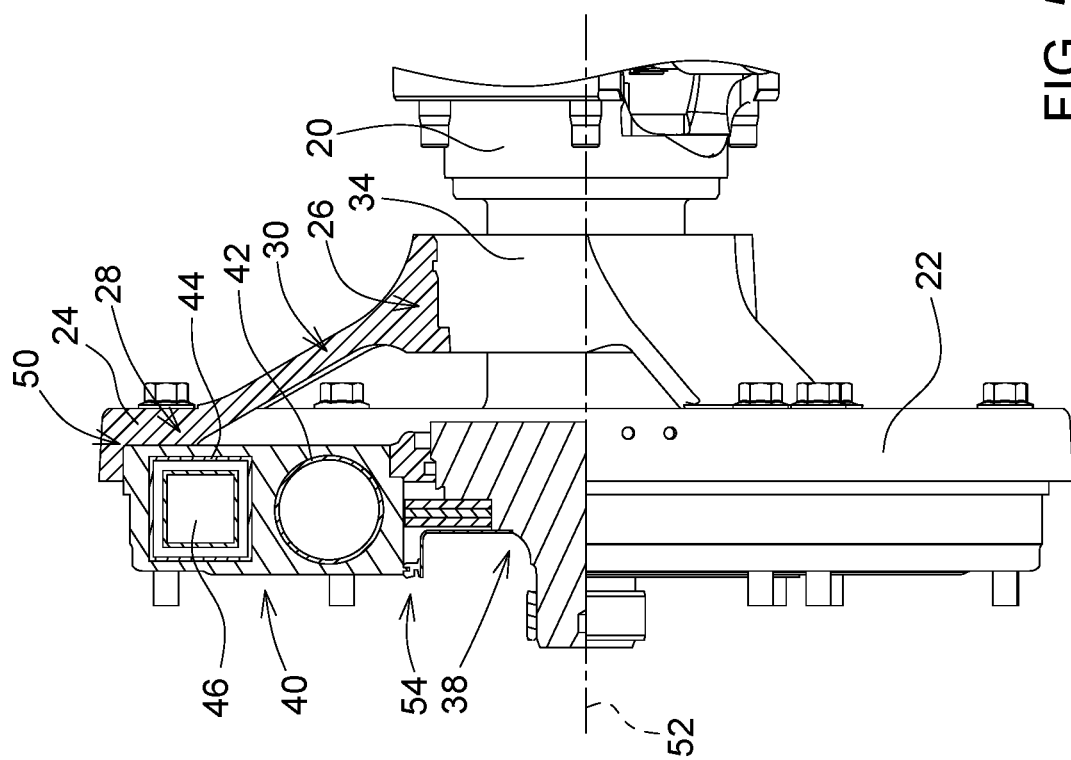
FIG. 5 is a partial cross-sectional view of portions of a powertrain assembly for a work vehicle in accordance with an embodiment of the present disclosure.

FIG. 4 illustrates a cross section of portions of the assembly 10 including the torsional damping member 22, the damping member support 24, and the shaft 20. As shown in FIG. 4, the assembly 10 and/or the damping member support 24 include(s) a bearing member 34 disposed at the shaft engagement portion 26 such that the damping member support 24 is rotatable or pivotable relative to the shaft 20. The bearing member 34 in the illustrated embodiment is a ball bearing assembly, but may include one or more of a radial, thrust, roller, pin, fluid, plain, sleeve, or other bearing type or configuration to allow relative rotation between the shaft 20 and the shaft engagement portion 26 of the damping member support 24. In the illustrated embodiment, the bearing member 34 is positioned at or on a damping member shaft 48. The damping member shaft 48 forms part of the shaft 20 in the illustrated embodiment, but may be coupled to the shaft 20 in one or more additional embodiments. The damping member shaft 48 of the illustrated embodiment extends through and is coaxial with the torsional damping member 22 in the illustrated embodiment.

The intermediate portion 30 includes a plurality of connecting members 36 extending axially from the shaft engagement portion 26 to the damping member engagement portion 28. In the illustrated embodiment, the plurality of connecting members 36 extends axially and radially outward from the shaft engagement portion 26 to the damping member engagement portion 28. The plurality of connecting members 36 include three spokes in the illustrated embodiment, best shown in FIG. 3, but includes any number of spokes or other structure(s) capable of transmitting force between the damping member engagement portion 28 and the shaft engagement portion 26 in additional embodiments.

Referring now to FIG. 5, with continuing reference to FIGS. 1-4, the torsional damping member 22 includes a first portion 38 and a second portion 40 disposed radially outward from the first portion 38. The first portion 38 of the torsional damping member 22 is rotatable or pivotable relative to the second portion 40 of the torsional damping member 22. In the embodiment illustrated, the first portion 38 and the second portion 40 of the torsional damping member 22 are configured to rotate or pivot relative to each other about their common axis 52. One or more spring members 42 or other biasing members is/are operatively disposed between the first portion 38 and the second portion 40. One or more fluid-tight cavities 44 is/are mechanically disposed between the first portion 38 and the second portion 40 to contain a viscous or other fluid. One or more fin(s) 46 is/are configured to rotate or pivot with each of the first portion 38 and the second portion 40 for relative movement between the fins 46 in the cavities 44. In one or more embodiments not illustrated, the torsional damping member 22 does not include a fluid and/or another component described herein.

The shaft 20 is coupled to the first portion 38 of the torsional damping member 22. In the illustrated embodiment, the shaft 20 is fixedly or rigidly coupled to the first portion 38 of the torsional damping member 22, i.e., coupled against relative angular, axial, or other displacement or motion. The damping member engagement portion 28 of the damping member support 24 is rigidly or fixedly coupled to the second portion 40 of the torsional damping member 22. The second portion 40 of the torsional damping member 22 is rigidly or fixedly coupled to the flywheel 16. When relatively large torsional loads act on the torsional damping member 22, the first portion 38 is angularly displaced from or does not correspond to the position or rotation of the second portion 40. Accordingly, the shaft 20 is angularly displaced from the damping member support 24 during a high torsional load event as permitted by the bearing member 34 and/or another structure configured for rotational support.

The shaft 20 transmits a torsional force to the first portion 38 of the torsional damping member 22 and/or the first portion 38 transmits a torsional force to the shaft 40 in one or more embodiments of the present disclosure. Further, the damping member support 24 transmits a non-torsional force to the second portion 40 of the torsional damping member 22 and/or the torsional damping member 22 transmits a non-torsional force to the second portion 40 of the damping member support 24 in one or more embodiments of the present disclosure.

In an embodiment not illustrated, the damping member support 24 is rotatably coupled to the first portion of the torsional damping member 22. In such an embodiment, the damping member support 24 allows torsional force to be transmitted between the first portion 38 and the second portion 40, but axial, radial, and/or other non-torsional forces are transmitted through the damping member support 24, bypassing an interface 54 between the first portion 38 and the second portion 40, as generally shown in FIG. 5.

In accordance with the embodiments described herein, axial, radial, and/or other non-torsional forces acting on or through the damping member shaft 48 may also act through the bearing member 34 and, therefore, through the damping member support 24 and the outer, second portion 40 of the torsional damping member 22. Accordingly, one or more embodiments of the present disclosure reduce non-torsional force differential between the first portion 38, which is coupled to the damping member shaft 48, and the second portion 40, which is coupled to the damping member support 24.

Without in any way limiting the scope, interpretation, or application of the claims appearing below, the embodiments described herein prevent or reduce non-torsional force differential acting through or on the torsional damping member 22. Non-torsional forces in conventional systems, including without limitation thrust, axial, radial, and/or unbalance forces, may act through or between powertrain components and/or through or between the first portion 38 and the second portion 40 of the torsional damping member 22 to potentially cause premature wear and/or damage to the torsional damping member 22 and/or other powertrain components. In a non-limiting example, a shifting operation of a transmission of the vehicle 12 may produce and transmit axial forces through the shaft 20 such that the torsional damping member 22 may receive positive or negative axial forces. Thrust loads of conventional systems act on the springs 42, the cavities 44, one or more seals or rings, and/or another portion of the torsional damping member 22 to cause damage or wear. The embodiments described herein provide the damping member support 24 and powertrain assembly 10 allowing bypass, sharing, or equalization of such non-torsional forces at or around the torsional damping member 22. Additionally, the mass of the damping member support 24 of the described embodiments supplements the rotating mass of the flywheel 16, the shaft 20, and the engine 14, thereby further improving torsional damping of the powertrain assembly 10, such as during shifting events of the transmission or another operation of the powertrain component 18. The embodiments described herein extend the life of the torsional damping member 22 and/or prevent or reduce wear, damage, and/or other adverse effects to the torsional damping member 22 caused by non-torsional forces acting on the torsional damping member 22.

While the above describes example embodiments of the present disclosure, these descriptions should not be viewed in a limiting sense. Rather, other variations and modifications may be made without departing from the scope and spirit of the present disclosure as defined in the appended claims.

What is claimed is:

1. A damping member support for non-torsional force bypass around a torsional damping member, the support comprising:
    a shaft engagement portion configured to be rotatably coupled to a shaft transmitting a torsional force;
    a damping member engagement portion configured to be coupled to the torsional damping member; and
    an intermediate portion disposed between the shaft engagement portion and the damping member engagement portion and configured to transmit a non-torsional force between the shaft and the torsional damping member.

2. The damping member support of claim 1, wherein the shaft is configured to be coupled to a first portion of the torsional damping member.

3. The damping member support of claim 2, wherein the damping member engagement portion is configured to be coupled to a second portion of the torsional damping member disposed radially outward from the first portion of the torsional damping member.

4. The damping member support of claim 3, wherein the second portion of the torsional damping member is coupled to a flywheel.

5. The damping member support of claim 3, wherein the first portion of the torsional damping member is rotatable relative to the second portion of the torsional damping member.

6. The damping member support of claim 1, further comprising a bearing member disposed at the shaft engagement portion to allow relative rotation between the damping member support and the shaft.

7. The damping member support of claim 1, wherein the intermediate portion comprises a plurality of connecting members extending axially from the shaft engagement portion to the damping member engagement portion.

8. A powertrain assembly for a work vehicle, the assembly comprising:
    an engine having a flywheel configured to provide torsional force for the work vehicle;
    a powertrain component receiving the torsional force from the engine;
    a shaft disposed between the flywheel of the engine and the powertrain component, the shaft transferring the torsional force between the flywheel and the powertrain component;
    a torsional damping member coupled to the flywheel and the shaft to transfer the torsional force between the flywheel and the shaft through the torsional damping member; and
    a damping member support having a damping member engagement portion coupled to the torsional damping member and an intermediate portion transmitting a non-torsional force between the shaft and the torsional damping member;
    wherein the damping member support further includes a shaft engagement portion rotatably coupled to the shaft, the intermediate portion disposed between the shaft engagement portion and the damping member engagement portion.

9. The assembly of claim 8, further comprising a bearing member disposed at the shaft engagement portion such that the damping member support is rotatable relative to the shaft.

10. The assembly of claim 8, wherein the intermediate portion comprises a plurality of connecting members extending axially from the shaft engagement portion to the damping member engagement portion.

11. The assembly of claim 8, wherein the torsional damping member comprises a first portion and a second portion disposed radially outward from the first portion.

12. The assembly of claim 11, wherein the shaft is coupled to the first portion of the torsional damping member.

13. The assembly of claim 11, wherein the damping member engagement portion of the torsional damping member is coupled to the second portion of the torsional damping member.

14. The assembly of claim 11, wherein the second portion of the torsional damping member is coupled to the flywheel.

15. The assembly of claim 8, wherein the powertrain component is a transmission.

16. A powertrain assembly for a work vehicle, the assembly comprising:
    an engine having a flywheel configured to provide torsional force for the work vehicle;
    a powertrain component receiving the torsional force from the engine;
    a shaft disposed between the flywheel of the engine and the powertrain component, the shaft transferring the torsional force between the flywheel and the powertrain component;
    a torsional damping member coupled to the flywheel and the shaft to transfer the torsional force between the flywheel and the shaft through the torsional damping member; and
    a damping member support having a damping member engagement portion coupled to the torsional damping member and an intermediate portion transmitting a non-torsional force between the shaft and the torsional damping member;
    wherein the torsional damping member comprises a first portion and a second portion disposed radially outward from the first portion; and
    wherein the first portion of the torsional damping member is rotatable relative to the second portion of the torsional damping member.

17. A powertrain assembly for a work vehicle, the assembly comprising:
- an engine having a flywheel configured to provide torsional force for the work vehicle;
- a powertrain component receiving the torsional force from the engine;
- a shaft disposed between the flywheel of the engine and the powertrain component, the shaft transferring the torsional force between the flywheel and the powertrain component;
- a torsional damping member coupled to the flywheel and the shaft to transfer the torsional force between the flywheel and the shaft through the torsional damping member; and
- a damping member support having a damping member engagement portion coupled to the torsional damping member and an intermediate portion transmitting a non-torsional force between the shaft and the torsional damping member;
- wherein the torsional damping member comprises a first portion and a second portion disposed radially outward from the first portion; and
- wherein the shaft and the first portion of the torsional damping member are configured to transmit a torsional force therebetween, and the damping member support and the second portion of the torsional damping member are configured to transmit a non-torsional force therebetween.

\* \* \* \* \*